United States Patent
Xiao et al.

(10) Patent No.: US 12,219,573 B2
(45) Date of Patent: Feb. 4, 2025

(54) CROSS-CARRIER SCHEDULING TECHNIQUES

(71) Applicant: ZTE Corporation, Guangdong (CN)

(72) Inventors: Kai Xiao, Guangdong (CN); Jing Shi, Guangdong (CN); Wei Gou, Guangdong (CN); Peng Hao, Guangdong (CN); Xingguang Wei, Shenzhen (CN); Shuaihua Kou, Shenzhen (CN)

(73) Assignee: ZTE Corporation, Guangdong (CN)

( * ) Notice: Subject to any disclaimer, the term of this patent is extended or adjusted under 35 U.S.C. 154(b) by 376 days.

(21) Appl. No.: 17/814,139

(22) Filed: Jul. 21, 2022

(65) Prior Publication Data

US 2022/0369355 A1 Nov. 17, 2022

Related U.S. Application Data

(63) Continuation of application No. PCT/CN2020/120752, filed on Oct. 14, 2020.

(51) Int. Cl.
*H04W 72/23* (2023.01)
*H04L 1/1812* (2023.01)
*H04W 72/1263* (2023.01)

(52) U.S. Cl.
CPC ........... *H04W 72/23* (2023.01); *H04L 1/1812* (2013.01); *H04W 72/1263* (2013.01)

(58) Field of Classification Search
CPC .... H04W 72/23; H04W 72/1263; H04L 5/001
See application file for complete search history.

(56) References Cited

U.S. PATENT DOCUMENTS

| 10,735,170 | B2 | 8/2020 | Yang et al. | |
|---|---|---|---|---|
| 2014/0098661 | A1* | 4/2014 | Huang | H04W 72/52 370/329 |
| 2016/0073434 | A1* | 3/2016 | Zhang | H04W 74/0808 370/329 |
| 2017/0099121 | A1* | 4/2017 | Uchino | H04L 1/1845 |
| 2017/0289936 | A1 | 10/2017 | Chae et al. | |

(Continued)

FOREIGN PATENT DOCUMENTS

CN 109842477 6/2019

OTHER PUBLICATIONS

International Search Report and Written Opinion for PCT/CN2020/120752, filed Oct. 14, 2020, Report dated Jul. 12, 2021, 9 pages.

(Continued)

*Primary Examiner* — Hanh N Nguyen
(74) *Attorney, Agent, or Firm* — Perkins Coie LLP

(57) ABSTRACT

Techniques are described to perform cross-carrier scheduling. A wireless communication method comprises transmitting, by a network node to a communication node, a control information that schedules at least two shared channels for data transmission, where the control information is transmitted using a first channel associated with a first component carrier, and where the at least two shared channels are associated with at least two component carriers; and transmitting, to the communication node and using the at least two shared channels, at least two transmission blocks comprising data.

20 Claims, 15 Drawing Sheets

(56) References Cited

U.S. PATENT DOCUMENTS

| | | | |
|---|---|---|---|
| 2020/0244424 A1* | 7/2020 | Fröberg Olsson | H04W 24/04 |
| 2021/0014883 A1* | 1/2021 | Khoshnevisan | H04W 72/23 |
| 2021/0258998 A1* | 8/2021 | Khoshnevisan | H04L 5/0044 |

OTHER PUBLICATIONS

Huawei, et al. "Discussion and text proposal for HARQ-ACK on PUCCH format 0/1," 3GPP TSG RAN WG1 Meeting #92 R1-1802727, Athens, Greece, Feb. 26-Mar. 2, 2018, 4 pages.

* cited by examiner

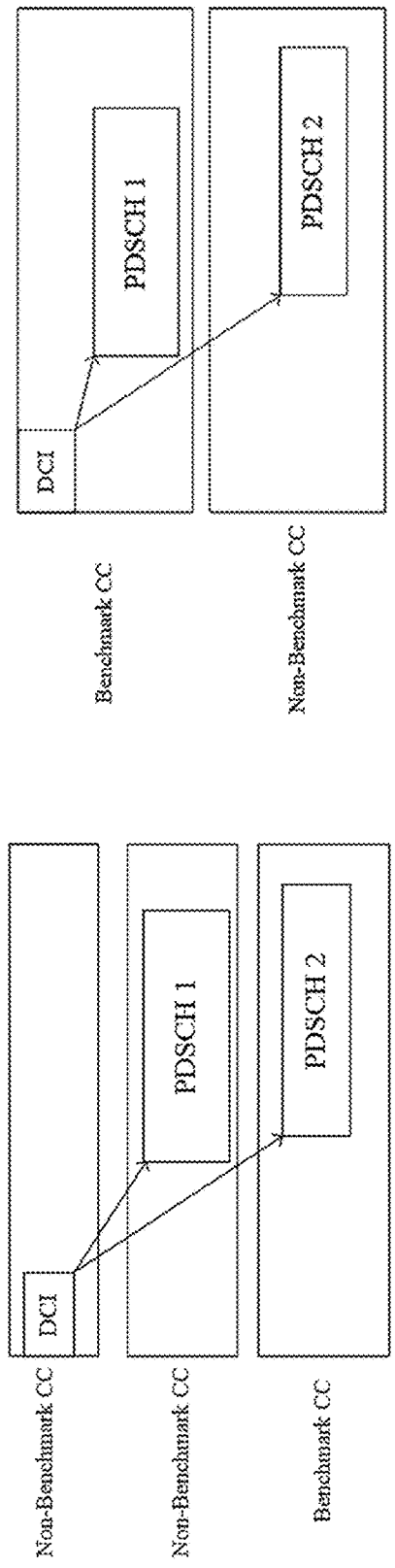
FIG. 3A
FIG. 3B
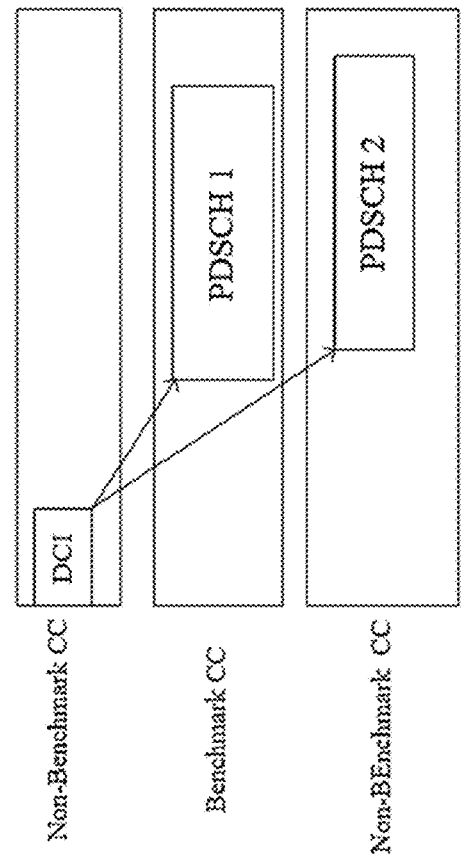
FIG. 3C

500F

502F: Transmitting, by a network node to a communication node, a control information that schedules at least two shared channels for data transmission, wherein the control information is transmitted using a first channel associated with a first component carrier, where the at least two shared channels are associated with at least two component carriers that operate in at least two scheduling modes, where the at least two scheduling modes includes a first mode in which each of the at least two component carriers is configured to operate independently, and where the at least two scheduling modes includes a second mode in which all of the at least two component carriers are configured to operate as a single component carrier 504F: Transmitting, to the communication node and using the two shared channels, at least one transmission block comprising data

FIG. 5F

CROSS-CARRIER SCHEDULING TECHNIQUES

CROSS-REFERENCE TO RELATED APPLICATION

This application claims priority to International Application No. PCT/CN2020/120752, filed on Oct. 14, 2020, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for cross-carrier scheduling. A first example wireless communication method comprises transmitting, by a network node to a communication node, a control information that schedules at least two shared channels for data transmission, where the control information is transmitted using a first channel associated with a first component carrier, and where the at least two shared channels are associated with at least two component carriers; and transmitting, to the communication node and using the at least two shared channels, at least two transmission blocks comprising data.

In some embodiments of the first example wireless communication method, the control information includes at least one bit that indicates to the communication node whether to perform soft combining of the data on the least two shared channels. In some embodiments of the first example wireless communication method, the method further comprises transmitting a radio resource control (RRC) signaling that includes at least one bit that indicates to the communication node whether to perform soft combining of the data on the least two shared channels. In some embodiments of the first example wireless communication method, the at least two shared channels comprise a first shared channel and second shared channel, data of the first shared channel is soft combined with data of the second shared channel that is associated with a benchmark component carrier, the benchmark component carrier includes a primary component carrier, and an identity of the first shared channel is indicated by signaling transmitted by the network node.

In some embodiments of the first example wireless communication method, the identity of the first shared channel is indicated by an index value included in the signaling transmitted in the first channel, where the identity is previously associated with the index value. In some embodiments of the first example wireless communication method, the index value is included in a carrier indicator field (CIF) in a downlink control information (DCI). In some embodiments of the first example wireless communication method, a communication between the network node and the communication node supports N transmission modes, and the method further comprises: transmitting a radio resource control (RRC) signal that includes $\lceil\sqrt{N}\rceil$ bit, where $\lceil\sqrt{N}\rceil$ indicates a nearest integer greater than or equal to a square root of N. In some embodiments of the first example wireless communication method, a communication between the network node and the communication node supports N transmission modes, the control information includes $\lceil\sqrt{N}\rceil$ bit, and $\lceil\sqrt{N}\rceil$ indicates a nearest integer greater than or equal to a square root of N.

A second example wireless communication method comprises receiving, by a communication node from a network node, a control information that schedules at least two shared channels for data reception, where the control information is received using a first channel associated with a first component carrier, and where the at least two shared channels are associated with at least two component carriers whose transmission mode includes a transmission block based transmission or a code block group (CBG) based transmission; receiving, by the communication node and using the at least two shared channels, at least two transmission blocks or at least two CBGs comprising data; and transmitting, by the communication node to the network node, a feedback that indicates whether the data received using the at least two shared channels is successfully decoded.

In some embodiments of the second example wireless communication method, the feedback indicates whether the data received from one shared channel of the two shared channels is successfully decoded, the one shared channel is predefined or is indicated by a radio resource control (RRC) signal, X indicates a number of time domain symbols between a first symbol of the feedback and a last symbol of a shared channel carrying the data, and X is predefined or X is configured by the RRC signal or X is based on a capability of the communication node.

A third example wireless communication method comprises receiving, by a communication node from a network node, a control information that schedules at least two shared channels for data transmission, where the control information is received using a first channel associated with a first component carrier, and where the at least two shared channels are associated with at least two component carriers; receiving, by the communication node and using the two shared channels, at least two transmission blocks comprising data, where the at least two transmission blocks are same; and combining the data included in the at least two transmission blocks using a soft combining technique indicated by a plurality of redundancy version (RV) indication fields in the control information.

In some embodiments of the third example wireless communication method, the soft combining technique includes a chasing combining mode or an incremental redundancy mode. In some embodiments of the third example wireless communication method, the chase combining mode is used to combine the data in response to each RV indication field being equal.

A fourth example wireless communication method comprises receiving, by a communication node from a network node, a control information that schedules at least two shared channels for data transmission, where the control information is received using a first channel associated with a first component carrier, and where the at least two shared channels are associated with at least two component carriers; receiving, by the communication node and using the two shared channels, at least two code block groups (CBGs) comprising data, where the at least two transmission blocks are different; and performing soft combining technique on the data at a CBG level based on an indication in a radio resource control (RRC) configuration of each shared channel. In some embodiments of the fourth example wireless communication method, a number of code block group transmission information (CBGTI) bits is equal to a total number of CBGs in all of the at least two component carrier scheduled by the control information.

A fifth example wireless communication method comprises receiving, by a communication node from a network node, a control information that schedules at least two shared channels for data transmission, where the control information is received using a first channel associated with a first component carrier, and where the at least two shared channels are associated with at least two component carriers; receiving, by the communication node and using the two shared channels, at least two transmission blocks comprising data; and performing soft combining technique on the data received from the at least two transmission blocks, where the soft combining technique is performed by sharing hybrid automatic repeat request (HARQ) process numbers, where a maximum of the HARQ process numbers shared by the at least two component carriers is predefined or signaled using a radio resource control (RRC) signal.

In some embodiments of the fifth example wireless communication method, the communication node performs the soft combining technique by sharing a first HARQ process number for a first set of $c-\lfloor P/c \rfloor \times c$ component carriers is $\lfloor P/c \rfloor$, where the communication node performs the soft combining technique by sharing a second HARQ process number for a remaining set of component carriers is $\lceil P/c \rceil$, where P the maximum of the HARQ process numbers, and where c is a total number of component carriers.

A sixth example wireless communication method comprises transmitting, by a network node to a communication node, a control information that schedules at least two shared channels for data transmission, where the control information is transmitted using a first channel associated with a first component carrier, where the at least two shared channels are associated with at least two component carriers that operate in at least two scheduling modes, where the at least two scheduling modes includes a first mode in which each of the at least two component carriers is configured to operate independently, and where the at least two scheduling modes includes a second mode in which all of the at least two component carriers are configured to operate as a single component carrier; and transmitting, to the communication node and using the two shared channels, at least one transmission block comprising data.

In some embodiments of the sixth example wireless communication method, the method further includes transmitting, in a radio resource control (RRC) signal, a field that includes at least one bit that indicates whether the at least two scheduling modes is indicated by the control information. In some embodiments of the sixth example wireless communication method, the field includes at least a first bit and the at least two component carriers include a first component carrier and a second component carrier, the first bit indicates a first scheduling mode of the first component carrier and a second scheduling mode of the second component carrier.

A seventh example wireless communication method comprises transmitting, by a network node to a communication node, a control information that schedules at least two shared channels for data transmission, where the control information is transmitted using a first channel associated with a first component carrier, and where the at least two shared channels are associated with at least two component carriers that are configured to operate as a single component carrier; and transmitting, to the communication node and using the two shared channels, at least two transmission blocks comprising data.

In some embodiments of the seventh example wireless communication method, the at least two component carriers includes a component carrier having a lowest frequency band or a highest frequency band, where the component carrier is a benchmark component carrier. In some embodiments of the seventh example wireless communication method, the at least two component carriers includes a component carrier that is a benchmark component carrier, the at least two component carriers include one or more non-benchmark component carriers other than the benchmark component carriers, and a first set of configuration parameters for the one or more non-benchmark component carries are based on a second set of configuration parameters of the benchmark component carriers. In some embodiments of the seventh example wireless communication method, the at least two component carriers includes a component carrier that is a benchmark component carrier, the at least two component carriers include one or more non-benchmark component carriers other than the benchmark component carriers, and a frequency domain resource allocation (FDRA) parameters for the data transmission are based on cascaded bandwidth part (BWP) of all of the at least two component carriers.

An eighth example wireless communication method comprises receiving, by a communication node from a network node, a control information that schedules at least two shared channels for data transmission, where the control information is received using a first channel associated with a first component carrier, where the at least two shared channels are associated with at least two component carriers; receiving, by the communication node and using the two shared channels, at least two transmission blocks or at least two code block groups (CBGs) comprising data, where the data is received within a bandwidth part (BWP) range of one component carrier of the at least two component carriers; and transmitting, by the communication node to the network node, a feedback that indicates whether the data received using the at least two shared channels is successfully decoded, wherein the feedback is transmitted on a benchmark component carrier or the one component carrier.

A ninth example wireless communication method comprises receiving, by a communication node from a network node, a control information that schedules at least two shared channels for data transmission, where the control information is received using a first channel associated with a first component carrier, where the at least two shared channels are associated with at least two component carriers; receiving, by the communication node and using the two shared channels, at least two transmission blocks or at least two code block groups (CBGs) comprising data, where the data is received within a bandwidth part (BWP) range of more than one component carrier of the at least two component carriers; and transmitting, by the communication node to the network node, a feedback that indicates whether the data received using the at least two shared channels is successfully decoded, where the feedback is independently transmitted on each component carrier of the at least two component carriers.

A tenth example wireless communication method comprises transmitting, by a network node to a communication node, a control information that schedules at least two shared channels for data transmission, where the control information is transmitted using a first channel associated with a first component carrier, and where the at least two shared channels are associated with at least two component carriers that are configured to operate as a single component carrier; transmitting, to the communication node and using the two shared channels, data using at least two transmission blocks or at least two code block groups (CBGs); and performing a retransmission operation in which at least one transmission block or at least one code block group (CBG) is retransmitted to the communication node.

In some embodiments of the tenth example wireless communication method, the retransmission operation is performed using a benchmark component carrier or using a component carrier having an active bandwidth part (BWP). In some embodiments of the first to tenth example wireless communication methods, one or more of the at least two component carriers is same as the first component carrier. In some embodiments of the first to tenth example wireless communication methods the control information comprises a single downlink control information (DCI), where the first channel comprises a physical downlink control channel (PDCCH), and where the at least two shared channels comprise at least two physical downlink shared channels (PDSCHs).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIGS. 3A-3C show three example scenarios for determining benchmark component carrier (CC).

FIG. 5A-5J shows example flowcharts for wireless communication methods.

DETAILED DESCRIPTION

Figure 1:
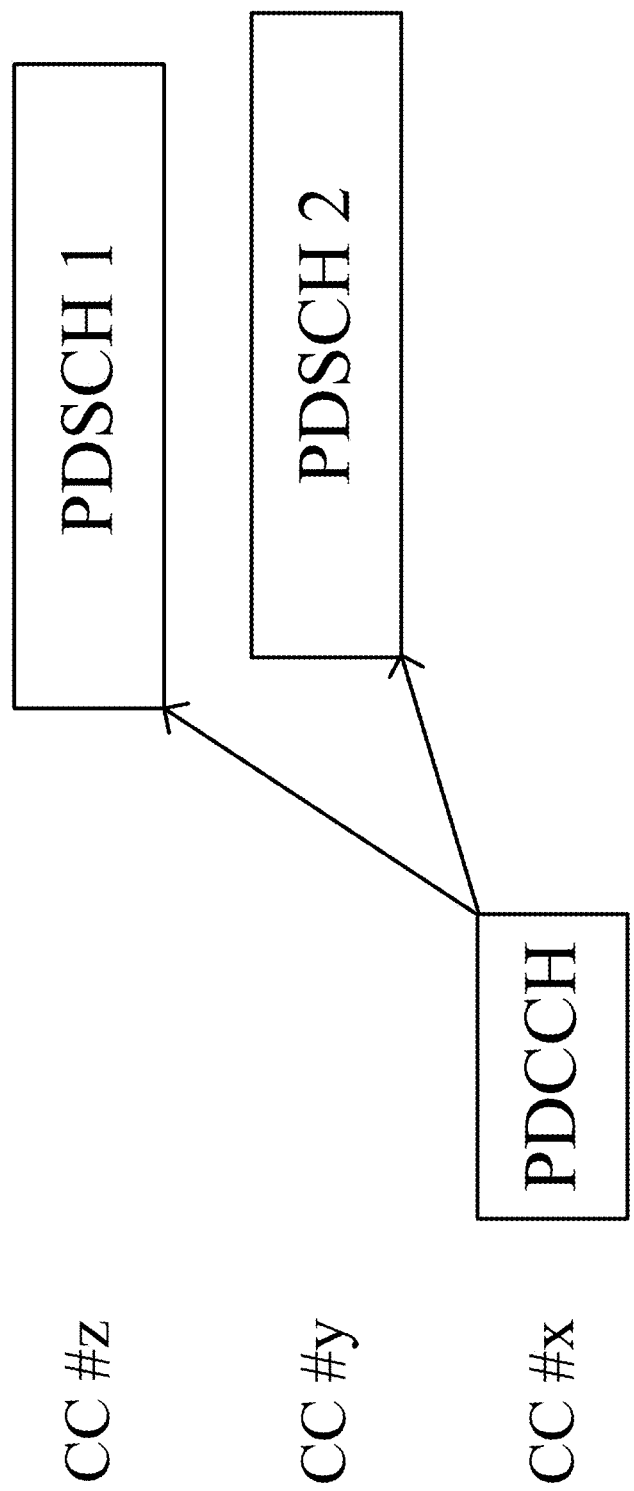
FIG. 1 shows an example scenario where a single downlink control information (DCI) schedules at least two physical downlink shared channels (PDSCHs)

Wireless communication service covers more and more application scenarios, with the increasing degree of social digitization. Among them, enhanced mobile broadband, ultra-reliable and low latency communication and massive machine type of communication have become three major scenarios supported by fifth generation (5G) systems. In terms of system performance, the 5G system will have a peak rate of 10~20 Gbit/s, 1 million connections per square kilometer, 1 ms air interface delay, 500 km/h mobility support, and 10 Mbit/s traffic per square meter. The 5G system supports the scheduling of multiple physical downlink shared channels (PDSCH) or two physical uplink shared channels (PUSCH) located in multiple component carriers (CC) through multiple downlink control information (DCI). This can further improve the system throughput.

Scheduling multiple PDSCHs or PUSCHs with multiple DCIs can improve the service throughput but may increase the number of DCIs in the system cell. This may further cause congestion to the physical downlink control channel (PDCCH) that carries DCIs. To avoid this situation, the single DCI scheduling solution is proposed in the next protocol version to schedule multiple PDSCHs or PUSCHs in different cells to reduce the number of DCIs and the PDCCH blocking rate. The new DCI in this scheme needs to schedule at multiple PDSCHs or PUSCHs. The PDSCHs or PUSCHs of the multiple CCs may be belong to different transmission blocks (TB), or the same TB, or one TB is located in multiple CCs. In order to schedule the PDSCHs or PUSCHs on different CCs according to the single DCI, a new hybrid automatic repeat request (HARQ) mechanism needs to be supported or else such a single DCI feature may have to be abandoned.

In the current technology, a single DCI is not allowed to schedule PDSCHs or PUSCHs on multiple carriers, such as when the scheduled PDSCHs or PUSCHs belong to the same transmission block. To support this scheduling, HARQ entity sharing needs to be supported between different CCs. The current wireless protocol does not support the shared HARQ of multiple CCs, so the related problems need to be solved as further described at least in Embodiments 1-5 in Section I of this patent document.

Current wireless protocols do not support resource scheduling when multiple CCs are aggregated as one CC. If one TB is scheduled on multiple CCs or retransmitted on multiple CCs, HARQ usage becomes disordered. To solve at least this technical problem, a mechanism provides this new type of cross-carrier scheduling as further described at least in Embodiments 6-10 in Section II of this patent document.

Multi-cell PDSCH or PUSCH scheduling via a single DCI is not supported by protocol now. To support at least this feature and reduce implementation difficulty, a potential technical solution includes splitting the DCI into 1-step DCI and 2-step DCI. To solve the technical problems caused by 1-step DCI and 2-step DCI, the new solution needs to be further considered as further described at least in Embodiment 11 in Section III of this patent document. In this patent document, the term "wireless protocol" or "wireless communication techniques" can also referred to as "protocol."

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Support for HARQ Entity Sharing Between Multipole Component Carriers (CCs)

Embodiment 1—Introduction

This embodiment describes example methods of soft combining indication for different scheduling mode as further described in Section I.(a) and this embodiment describes example methods for indicating transmission modes as further described in Section I.(b).

Figure 2:
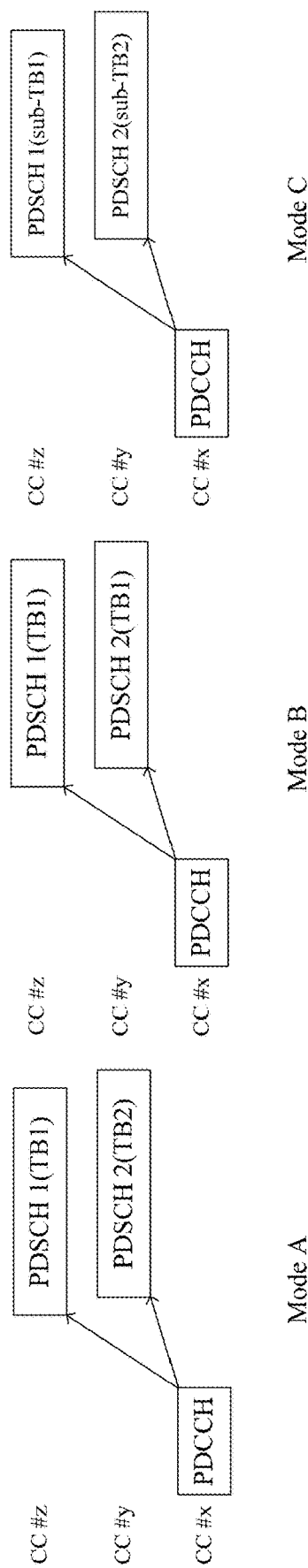
FIG. 2 shows three example scheduling modes that can be determined according to the transmission block (TB) carried by PDSCH.

The single DCI scheduling multiple transmission resources is carried by PDCCH. As shown in FIG. 1, the single DCI schedules at least two PDSCHs as an example. PDCCH is sent by gNB on CC #x, and PDSCH1 and PDSCH2 are scheduled by a single DCI on CC #z and CC #y respectively. The number x may be equal to the number y or the number z. As shown in FIG. 2, three scheduling modes can be determined according to the TB carried by PDSCH. For mode A in FIG. 2, the TBs carried by multiple PDSCHs are different. For mode B in FIG. 2, TBs carried by multiple PDSCHs are same. For mode C in FIG. 2, the sub-TBs are carried by multiple PDSCHs, where the sub-TBs belong to one TB (or one TB includes the multiple sub-TBs carried by multiple PDSCHs). From the perspective of receiver, TBs or sub-TBs may need to perform soft combining under mode B and C.

Embodiment 1—Techniques to Indicate Whether to Perform Soft Combining on Data Received on Multiple CC The example methods to determine whether the receiver may need to perform soft combining of decoded received information includes at least one of the following.

Method 1

A new DCI field is defined, and the field include at least 1 bit. The value of this/these bit(s) determine(s) whether the receiver performs soft combining of data transmitted between different CCs. For example, the new field includes 1 bit. For example, if the value of the bit is 1, the receiver performs soft combining of data transmitted between different CCs. Otherwise (e.g., if the bit is 0), the receiver does not perform soft combining.

Method 2

A new radio resource control (RRC) signaling is defined, and the signal is at least 1 bit. The value of this/these bit(s) determine(s) whether the receiver performs soft combining of data transmitted between different CCs. For example, the RRC signaling includes 1 bit. For example, if the value of the bit is 1, the receiver can perform soft combining of data transmitted between different CCs. Otherwise (e.g., if the bit is 0), the receiver cannot perform soft combining.

Method 3

Multiple CC pairs that can be soft combined are indicated by pre-defined protocol or RRC signaling configuration. When the CarrierindicatorField (CIF) in PDCCH indicates the index of one or more CCs in the CC pair, the receiver performs soft combining of data transmitted between different CCs after receiving multiple transmitted data of the CC pair. The CC pair include at least 2 CCs. Table 1, 2, 3 and 4 are provided as 4 examples. Using Table 1 as an example, if the CIF index is 1, then the receiver performs soft combining of data received by CC1 and CC0.

TABLE 1

| CIF Index | CC pair. |
|---|---|
| 0 | {CC 0, CC 1} |
| 1 | {CC 1, CC 0} |

TABLE 2

| CIF Index | CC pair. |
|---|---|
| 0 | {CC 0, CC 1} |
| 1 | {CC 1, CC 2} |
| 2 | {CC 2, CC 3} |
| 3 | {CC 3, CC 0} |

TABLE 3

| CIF Index | CC pair. |
|---|---|
| 0 | {CC 0, CC 1} |
| 1 | {CC 1, CC 2} |
| 2 | {CC 2, CC 3} |
| 3 | {CC 3, CC 4} |
| 4 | {CC 4, CC 5} |
| 5 | {CC 5, CC 6} |
| 6 | {CC 6, CC 7} |
| 7 | {CC 7, CC 0} |

TABLE 4

| CIF Index | CC pair. |
|---|---|
| 0 | {CC 0, CC 1, CC 2} |
| 1 | {CC 1, CC 2, CC 3} |
| 2 | {CC 2, CC 3, CC 0} |
| 3 | {CC 3, CC 0, CC 1} |

Method 4

Multiple CC pairs that can be soft combined are defined by predefined protocol or RRC signaling configuration. When the receiver receives the CIF index that indicates the corresponding CC, the receiver soft combines the transmitted data from the indicated CC by the CIF index and the benchmark CC. In this method for Embodiment 1, the benchmark CC can be the same as a primary CC in the current wireless protocol.

Method 5

The DCI format is bound to the CC that can be soft combining through predefined protocol. A new DCI format is defined, and the transmitted data from different CCs scheduled by the DCI can be soft combined.

Method 6

The specific radio network temporary identifier (RNTI) is bound to (or previously associated with) the CC that can be soft combined through predefined protocol. The transmitted data from different CCs scheduled by the DCI can be soft combined, if the cyclic redundancy check (CRC) of the DCI is scrambled by a specific RNTI.

Embodiment 1—Techniques to Determine Transmission Mode

The example methods to determine the transmission mode include at least one of the following.

Method 1

The protocol supports N transmission modes. The receiver determines the transmission mode by the RRC configuration. A new RRC signaling is defined, and the signal may include $\lceil \sqrt{N} \rceil$ bit, where $\lceil \sqrt{N} \rceil$ indicates a nearest (or smallest) integer greater than or equal to the square root of N.

Method 2

The protocol supports N transmission modes. The receiver determines the transmission mode according to the DCI indication. A new DCI field is defined, and the field may include $\lceil \sqrt{N} \rceil$ bits.

Method 3

The DCI format is bound to the transmission mode through predefined protocol. A new DCI format is defined, so that the transmitted data from different CCs scheduled by the DCI having the new format can perform soft combining.

Method 4

The specific radio network temporary identifier (RNTI) is bound to the transmission mode through predefined protocol. The transmitted data from different CCs scheduled by the DCI can be soft combined, if the cyclic redundancy check (CRC) of the DCI is scrambled by a specific RNTI.

Embodiment 2

This embodiment describes example methods to determine a number of CCs used by the receiver to perform HARQ feedback.

A single DCI schedule PDSCHs or PUSCHs on multiple CCs. The transmission mode of the CCs scheduled by the single DCI include TB based transmission or code block group (CBG) based transmission. The method to determine how to perform feedback includes at least one of the following, where the feedback indicates whether the data received from the multiple CCs was successfully decoded.

Method 1

The receiver provides independent feedback on each CC. The number of time domain symbols between the first symbol feedback channel and the last symbol of the channel carrying transmission data on each CC is X, where X may be predefined by the protocol, or X may be configured by the RRC, or X may be implemented based on a capability of receiver that may be previously indicated by the receiver to the base station.

Method 2

The receiver provides feedback on one CC predefined by the protocol or configured by the RRC. The number of time domain symbols between the first symbol feedback channel and the last symbol of the channel carrying transmission data on each CC is X, where X may be predefined by the protocol, or X may be configured by the RRC, or X may be implemented based on a capability of receiver that may be previously indicated by the receiver to the base station.

Embodiment 3

This embodiment describes an example method of soft combining indication for same TBs.

The receiver is instructed to perform soft combining and the transmission mode is B. The receiver determines the transmission mode by the RRC configuration or predefined protocol. For mode B, TBs carried by multiple PDSCHs are same. There is at least one soft combining mode. For example, soft combining modes include chase combining mode and incremental redundancy mode. The method to determine which soft combining mode the receiver perform includes at least one of the following.

There are multiple redundancy version (RV) indication field in the single DCI scheduling multiple transmission resources. Each RV field includes at least 1 bit and indicates an independent indicator. When the value of each RV field is equal, chase combining mode is used for soft combining. Otherwise, when the value of each RV field is not equal, incremental redundancy mode is used for soft combining.

Embodiment 4

This embodiment describes an example method of soft combining indication for different TBs.

A single DCI schedule PDSCHs or PUSCHs on multiple CCs. The transmission mode of the CCs scheduled by the single DCI include TB based transmission or code block group (CBG) based transmission. There are two soft combining level, TB level and CBG level. The receiver determines the soft combining level according to the RRC configuration of each CC. When the soft combining level is CBG level, the method to determine the number of CBG transmission information (CBGTI) bits includes at least one of the following:

Method 1

The number of CBGTI bits is equal to the number of the total CBGs in all CCs scheduled by the single DCI. The number of CBGTI bits is defined by protocol or configured by RRC signaling.

Method 2

The number of the CBGs in each CC is $n_i$ (i=0, ..., I−1), I is the number of CC. The number of CBGTI bits is equal to max $[n_0, \ldots, n_{I-1}]$. The number of CBGTI bits is defined by protocol or configured by RRC signaling.

Embodiment 5

This embodiment describes example methods to determine HARQ process number mapping on different CCs.

The single DCI schedules multiple transmission resources on different CCs. Each transmission resource is distributed on a CC. The maximum of HARQ process number shared by multiple CCs is P that can are defined by predefined protocol or RRC signaling configuration. The method to determine the process number of the CC includes at least one of the following:

Method 1

Average of HARQ process number shared by the CCs with the same HARQ entity. The total number of the CC is c. The HARQ process number of the first CC is $$c - \left\lfloor \frac{P}{c} \right\rfloor \times c \ CCs \ is \ \left\lfloor \frac{P}{c} \right\rfloor,$$

and the HARQ process number of the remaining CC is $$\left\lceil \frac{P}{c} \right\rceil.$$

If P is divisible by c, the HARQ process number of each CC is $$\frac{P}{c}.$$

Method 2

The number $p_i$ (i=0, ..., c−1) of HARQ process number of each CC with the same HARQ entity is configured by RRC signaling. $\Sigma_{i=0}^{c-1} p_i \leq P$.

II. Cross-Carrier Scheduling

Embodiment 6

This embodiment describes one method of mode changing for multiple CCs. The benchmark CC may include the primary CC, or the benchmark CC can be different from the primary CC in Embodiment 6-10 too.

The single DCI scheduling multiple transmission resources in at least two CCs operates in at least two scheduling modes. For example, there are two modes, mode 1 and mode 2. For mode 1, each CC operates independently, and the scheduling information of all CCs is carried by a single DCI. For mode 2, all CCs are regarded as a single CC and operate together by a single DCI. The CC mode can be determined by predefined protocol or RRC signaling configuration. For example, there are 4 CCs including 2 intra-band CC and 2 inter-band CC in a CC group, and intra-band CC supports mode 1 and mode 2 and inter-band CC only supports mode 1 as pre-defined by protocol. The method to indicate the mode of the CC includes at least one of the following.

Method 1

A new DCI field is defined, and the field include at least 1 bit. The value of this/these bit(s) determine(s) whether the mode of the CC scheduled by a single DCI. For example, the new field includes 1 bit and the total number of the CC is at least 1. If the value of the bit is 1, the mode of the CC scheduled by a single DCI is mode 1. Otherwise, the mode of the CC scheduled by a single DCI is mode 2. For another example, the new field includes 2 bit and the total number of the CC is 2. If the value of the bits are 1 and 0 respectively, the mode of the CC0 scheduled by a single DCI is mode 1 and the mode of the CC1 scheduled by a single DCI is mode 2.

Method 2

A new radio resource control (RRC) signaling is defined, and the signal is at least 1 bit. The value of this/these bit(s) determine(s) whether the mode of the CC scheduled by a single DCI. For example, the RRC signaling includes 1 bit and the total number of the CC is at least 1. If the value of the bit is 1, the mode of the CC scheduled by a single DCI is mode 1. Otherwise, the mode of the CC scheduled by a single DCI is mode 2. For another example, the RRC signaling includes 2 bit and the total number of the CC is 2. If the value of the bits are 1 and 0 respectively, the mode of the CC0 scheduled by a single DCI is mode 1 and the mode of the CC1 scheduled by a single DCI is mode 2.

Method 3

The DCI format is bound to the CC supporting mode 2 through predefined protocol. A new DCI format is defined, and the CC(s) scheduled by the format DCI support mode 2.

Method 4

The RNTI is bound to the CC supporting mode 2 through predefined protocol. The CC(s) scheduled by the format DCI support mode 2, if the CRC of the DCI is scrambled by the specific RNTI.

Embodiment 7

This embodiment describes example methods to determine which CC is benchmark CC if at least 2 CCs are regarded as a single CC and operate together by a single DCI.

The single DCI schedules multiple transmission resources in at least two CCs. All CCs are regarded as a single CC and operate together by a single DCI. For example, there are two CCs scheduled by a single DCI. CC0 is regarded as benchmark CC and CC1 is regarded as non-benchmark CC. The method to determine which CC is benchmark CC includes at least one of the following.

Method 1

The benchmark CC is pre-defined by the protocol, and the remaining CCs are non-benchmark CCs. For the example in FIG. 3A, the CC with the lowest or highest frequency band is predefined as the benchmark CC. For another example in FIG. 3B, the CC with the lowest or highest index is the benchmark CC. For another example, the CC with the transmitted single DCI is predefined as the benchmark CC. For another example in FIG. 3C, the nearest CC to the CC with the transmitted single DCI is predefined as the benchmark CC. The nearest CC may be the CC whose frequency is nearest to a frequency of the CC on which the DCI is transmitted.

Method 2

The benchmark CC is configured by RRC signaling, and the remaining CCs are non-benchmark CCs. For example, there are 4 CCs in a CC group, and benchmark CC indication RRC signaling is 2 bit. If the decimal value of the signaling bit is 2, then CC2 is the benchmark CC, and CC0, 1 and 3 are the non-benchmark CC. For another example, there are 4 CCs in a CC group, and benchmark CC indication RRC signaling is 4 bit. Each bit represents a CC. If the value represents benchmark CC and the value of the signaling bit is 0010, then CC2 is the benchmark CC, and CC0, 1 and 3 are the non-benchmark CC.

Embodiment 8

This embodiment describes example methods to determine the parameters configuration (also known as configuration parameters) for each CC if at least 2 CCs are regarded as a single CC and operate together by a single DCI.

The single DCI schedules multiple transmission resources in at least two CCs. All CCs are regarded as a single CC and operate together by a single DCI. According to the method of embodiment 7, the benchmark CC has been determined. The method to determine the parameters configuration for each CC includes at least one of the following.

Method 1

The configuration parameters are determined based on one of the CCs (for example, the benchmark CC). For example, there are 2 CCs in the CC group, and the benchmark CC is CC0. The time domain resource allocation (TDRA) table is different between CC0 and CC1. Then the TDRA table is configured based on the CC0. Similarly, multiple-input multiple-output related parameters (demodulation reference signal, transmission configuration indication, physical resource block bundling and channel state information reference signal) and PDSCH data related parameters (frequency domain resource allocation (FDRA), scrambling ID, resource block group (RBG), modulation and coding scheme table, max code word, rate match, code block group, HARQ, physical uplink control channel cell and max layer) can be determined based on the benchmark CC.

Method 2

The FDRA parameters are determined based on the cascaded bandwidth part (BWP) in all CCs. For example, the FDRA field is configured by RRC signaling according to the cascaded BWP in all CCs. Firstly, Cascade the BWP of multiple CCs to form a large-size BWP. Then, the RBGs are divided in accordance with the relationship between the BWP and RBG granularities predefined in the protocol. If an RBG is across at least two CCs, the RBG is split in accordance with the CC of the RB. The number of split RBGs equals to the number of CCs that the RBG crosses. The allocation type can be configured by RRC signaling according to the cascaded BWP too.

Embodiment 9

This embodiment describes one method for receiver to determine HARQ feedback according to scheduled transmission.

The transmission mode of the CCs scheduled by the single DCI include TB based transmission or CBG based transmission. All CCs are regarded as a single CC and operate together by a single DCI. The method to determine how to perform feedback includes at least one of the following.
Method 1
The scheduled transmission resource is within the BWP range of one CC, and the receiver execute fallback scheduling. The feedback is performed on the benchmark CC or the CC including the active BWP.
Method 2
The scheduled transmission resource is within the BWP range of more than one CC, and the receiver provides independent feedback on each CC.

Embodiment 10

This embodiment describes example methods for receiver to determine the re-transmission.

The transmission mode of the CCs scheduled by the single DCI include TB based transmission or CBG based transmission. All CCs are regarded as a single CC and operate together by a single DCI. The method to determine how to perform re-transmission includes at least one of the following.
Method 1
The re-transmission is performed on the benchmark CC or the CC including the active BWP. The benchmark CC is predefined by protocol or configured by RRC signaling. In one example, for the TB based transmission, the re-transmission can include the entire transmission block. In another example, for the CBG-based transmission, the re-transmission can include the CBG which is transmitted incorrectly for the first time.
Method 2
The re-transmission is performed on each CC.
Method 3
The re-transmission is performed on the CC where feedback has been executed.
III. Techniques to Implement Two-Step DCI Embodiment 11

This embodiment describes an example method for the 2-step DCI implementation.

Figure 4:
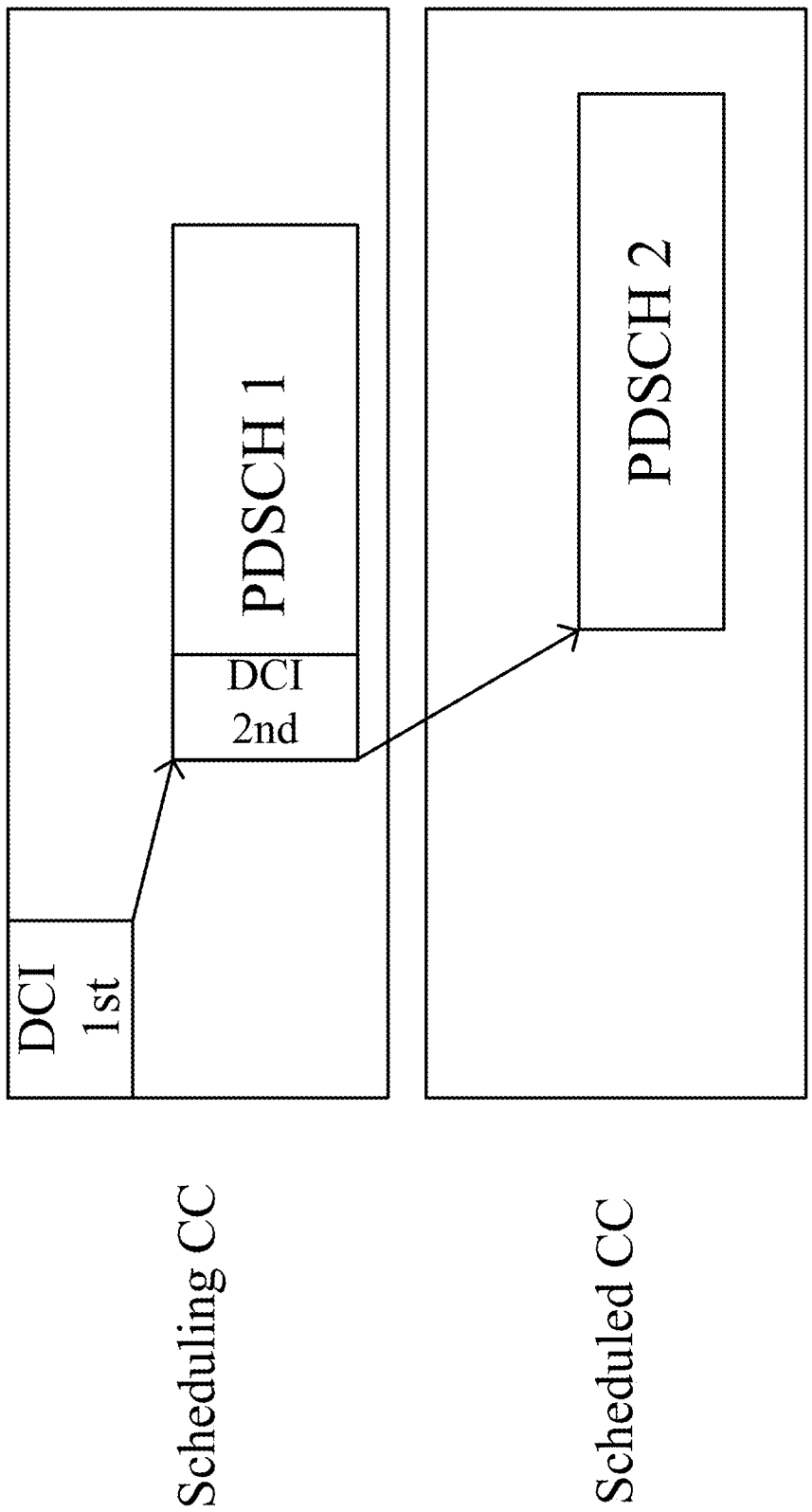
FIG. 4 shows an example 2-step DCI that schedules two PDSCHs.

The 2-step DCI is divided into two sub DCI, DCI 1st and DCI 2nd. The DCI 1st schedules the transmission resource on scheduling CC. The DCI 2nd is carried by the transmission resource on scheduling CC (for example, MAC Control Element). The DCI 2nd schedule multiple transmission resources on scheduled CC. As shown in FIG. 4, the 2-step DCI schedule two PDSCHs as an example. The DCI 1st schedule the PDSCH1 on scheduling CC, and the DCI 2nd schedule PDSCH2 on scheduled CC. The DCI 2nd is obtained by the receiver when the PDSCH1 is decoded. The method for the 2-step DCI implementation includes at least one of the following.
Method 1
The DCI fields are divided into the shared indication fields and the separate indication fields by predefined protocol or RRC signal configuration. The resource of DCI 1st carries the shared indication information. The resource of DCI 2nd carries the separate indication information. The shared indication information is valid for both PDSCHs, and the separate indication information is valid for PDSCH2. The DCI 2nd is located on the first d time domain symbols on the PDSCH1. The number of d is pre-defined by protocol or configured by RRC signaling.
Method 2
The resource of DCI 1st carries the scheduling information of scheduling CC, and the resource of DCI 2nd carries the scheduling information of scheduled CC. The DCI 2nd is located on the first d time domain symbols on the PDSCH1. The number of d is pre-defined by protocol or configured by RRC signaling.

Figure 5A:
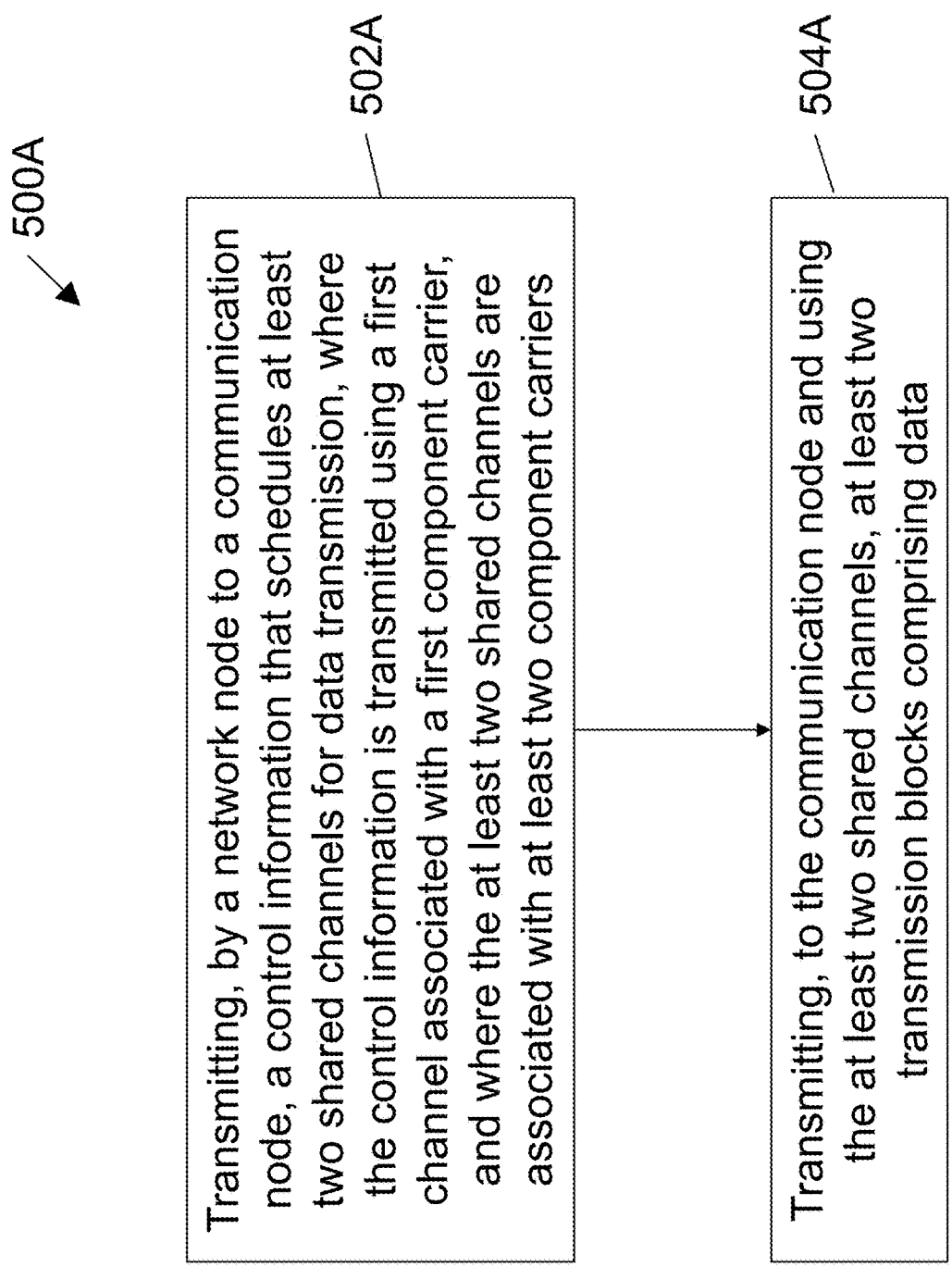

FIG. 5A shows an exemplary flowchart of a wireless communication method 500A. Operation 502A includes transmitting, by a network node to a communication node, a control information that schedules at least two shared channels for data transmission, where the control information is transmitted using a first channel associated with a first component carrier, and where the at least two shared channels are associated with at least two component carriers. Operation 504A includes transmitting, to the communication node and using the at least two shared channels, at least two transmission blocks comprising data.

In some embodiments of method 500A, the control information includes at least one bit that indicates to the communication node whether to perform soft combining of the data on the least two shared channels. In some embodiments of method 500A, the method further comprises transmitting a radio resource control (RRC) signaling that includes at least one bit that indicates to the communication node whether to perform soft combining of the data on the least two shared channels. In some embodiments of method 500A, the at least two shared channels comprise a first shared channel and second shared channel, data of the first shared channel is soft combined with data of the second shared channel that is associated with a benchmark component carrier, the benchmark component carrier includes a primary component carrier, and an identity of the first shared channel is indicated by signaling transmitted by the network node.

In some embodiments of method 500A, the identity of the first shared channel is indicated by an index value included in the signaling transmitted in the first channel, where the identity is previously associated with the index value. In some embodiments of method 500A, the index value is included in a carrier indicator field (CIF) in a downlink control information (DCI). In some embodiments of method 500A, a communication between the network node and the communication node supports N transmission modes, and the method further comprises: transmitting a radio resource control (RRC) signal that includes $\lceil \sqrt{N} \rceil$ bit, where $\lceil \sqrt{N} \rceil$ indicates a nearest integer greater than or equal to a square root of N. In some embodiments of method 500A, a communication between the network node and the communication node supports N transmission modes, the control information includes ⌈√N⌉ bit, and ⌈√N⌉ indicates a nearest integer greater than or equal to a square root of N.

Figure 5B:
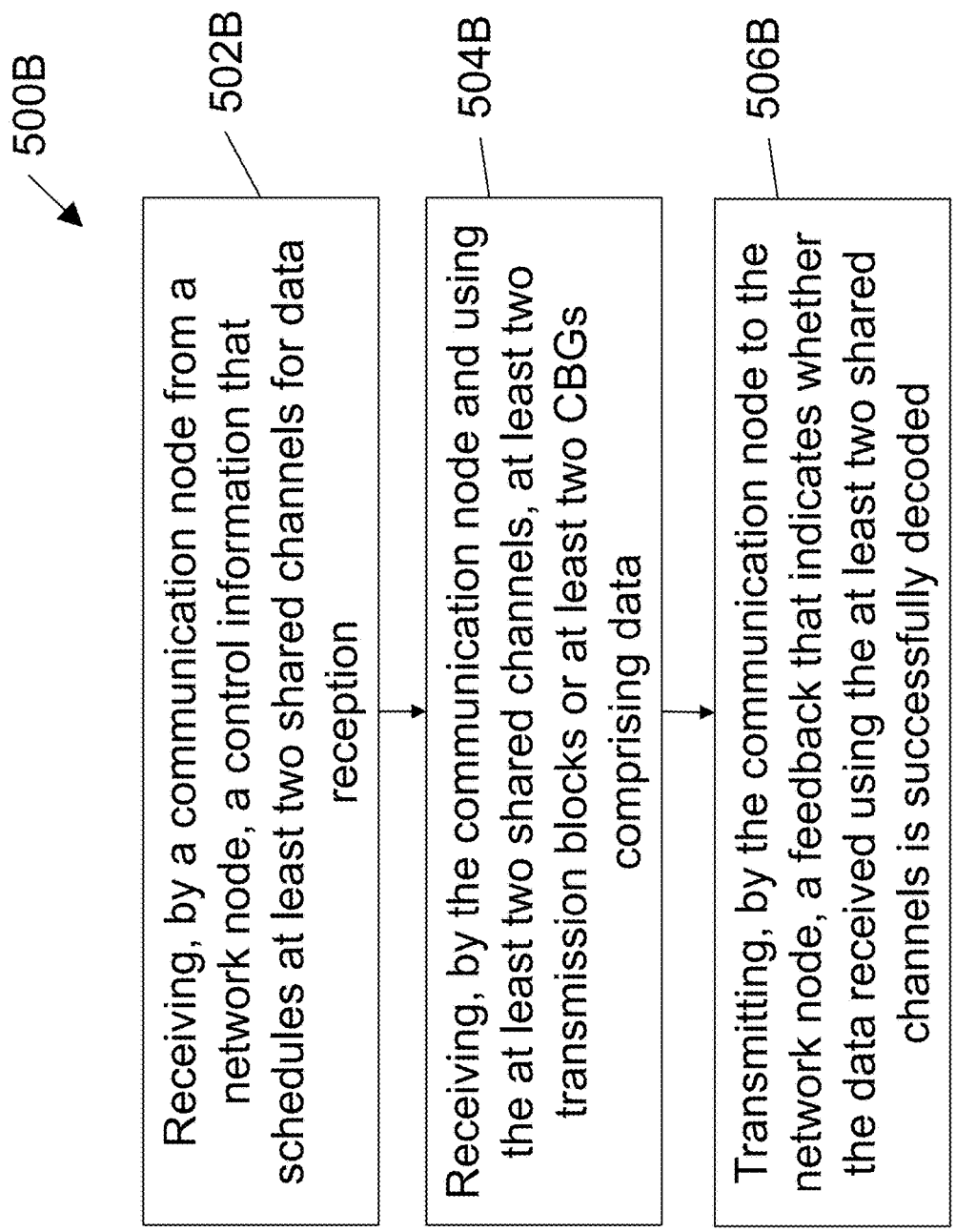

FIG. 5B shows an exemplary flowchart of a wireless communication method 500B. Operation 502B includes receiving, by a communication node from a network node, a control information that schedules at least two shared channels for data reception, where the control information is received using a first channel associated with a first component carrier, and where the at least two shared channels are associated with at least two component carriers whose transmission mode includes a transmission block based transmission or a code block group (CBG) based transmission. Operation 504B includes receiving, by the communication node and using the at least two shared channels, at least two transmission blocks or at least two CBGs comprising data. Operation 506B includes transmitting, by the communication node to the network node, a feedback that indicates whether the data received using the at least two shared channels is successfully decoded. In some embodiments of method 500B, the feedback indicates whether the data received from one shared channel of the two shared channels is successfully decoded, the one shared channel is predefined or is indicated by a radio resource control (RRC) signal, X indicates a number of time domain symbols between a first symbol of the feedback and a last symbol of a shared channel carrying the data, and X is predefined or X is configured by the RRC signal or X is based on a capability of the communication node.

Figure 5C:
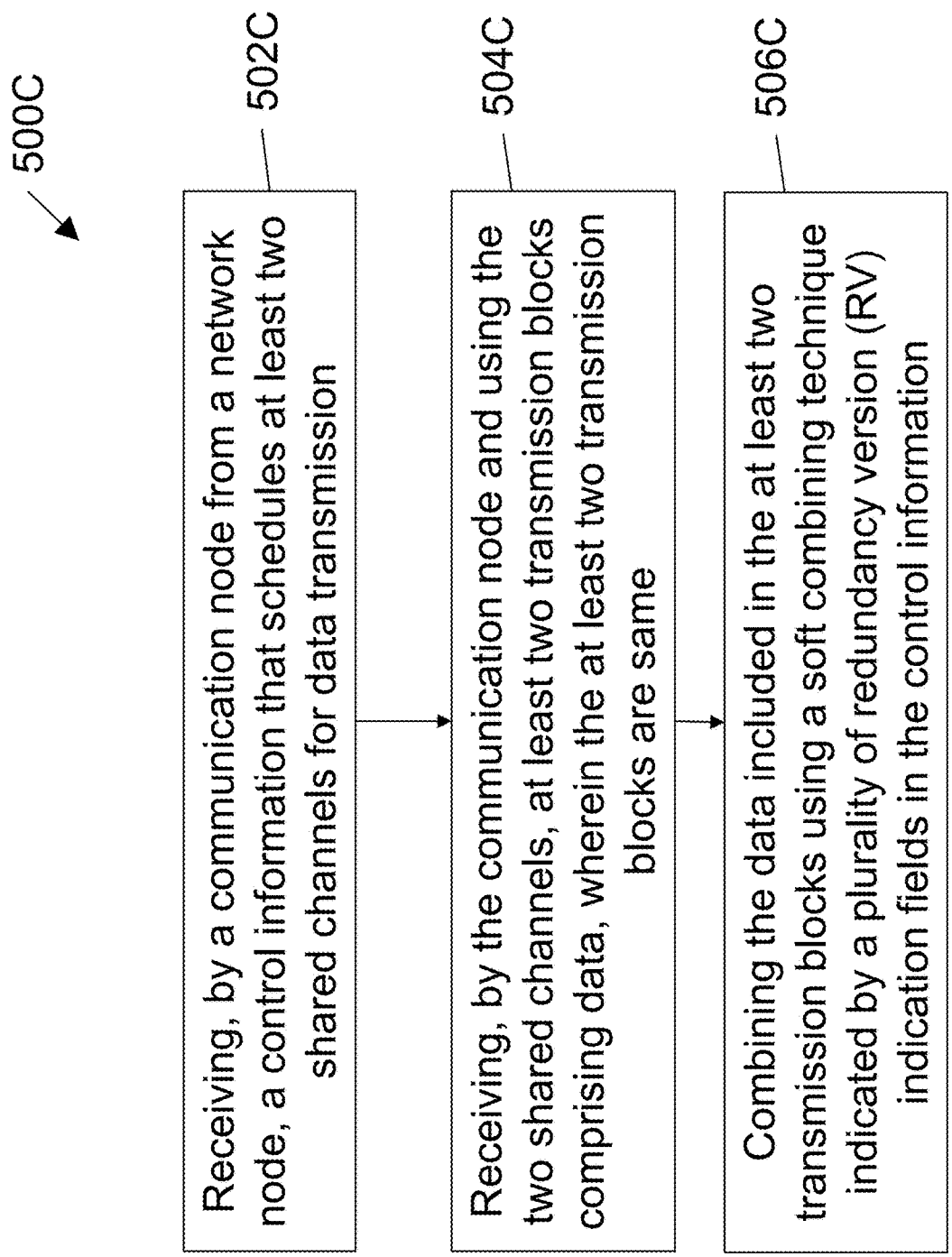

FIG. 5C shows an exemplary flowchart of a wireless communication method 500C. Operation 502C includes receiving, by a communication node from a network node, a control information that schedules at least two shared channels for data transmission, where the control information is received using a first channel associated with a first component carrier, and where the at least two shared channels are associated with at least two component carriers. Operation 504C includes receiving, by the communication node and using the two shared channels, at least two transmission blocks comprising data, where the at least two transmission blocks are same. Operation 506C includes combining the data included in the at least two transmission blocks using a soft combining technique indicated by a plurality of redundancy version (RV) indication fields in the control information.

In some embodiments of method 500C, the soft combining technique includes a chasing combining mode or an incremental redundancy mode. In some embodiments of method 500C, the chase combining mode is used to combine the data in response to each RV indication field being equal.

Figure 5D:
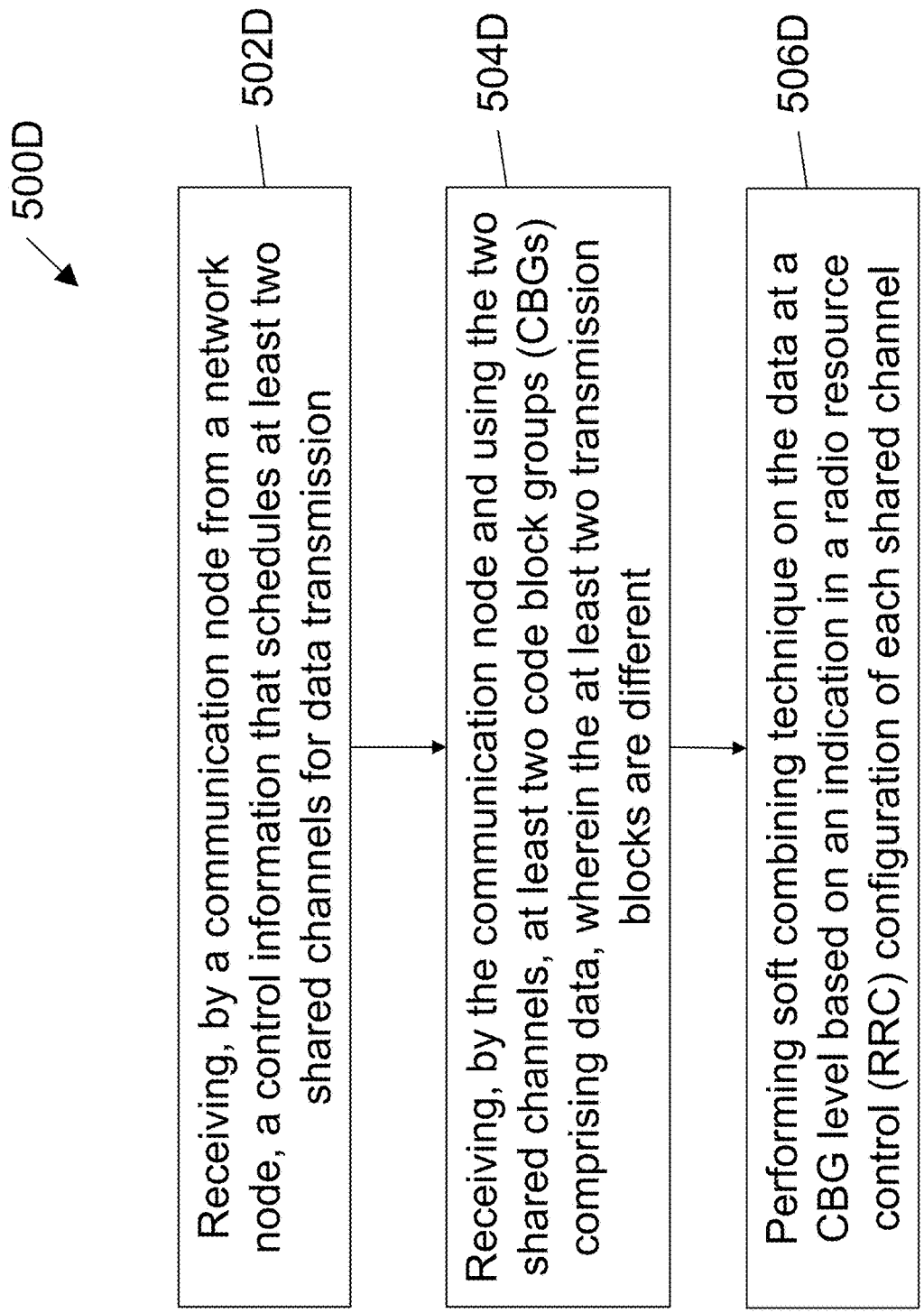

FIG. 5D shows an exemplary flowchart of a wireless communication method 500D. Operation 502D includes receiving, by a communication node from a network node, a control information that schedules at least two shared channels for data transmission, where the control information is received using a first channel associated with a first component carrier, and where the at least two shared channels are associated with at least two component carriers. Operation 504D includes receiving, by the communication node and using the two shared channels, at least two code block groups (CBGs) comprising data, where the at least two transmission blocks are different. Operation 506D includes performing soft combining technique on the data at a CBG level based on an indication in a radio resource control (RRC) configuration of each shared channel. In some embodiments of method 500D, a number of code block group transmission information (CBGTI) bits is equal to a total number of CBGs in all of the at least two component carrier scheduled by the control information.

Figure 5E:
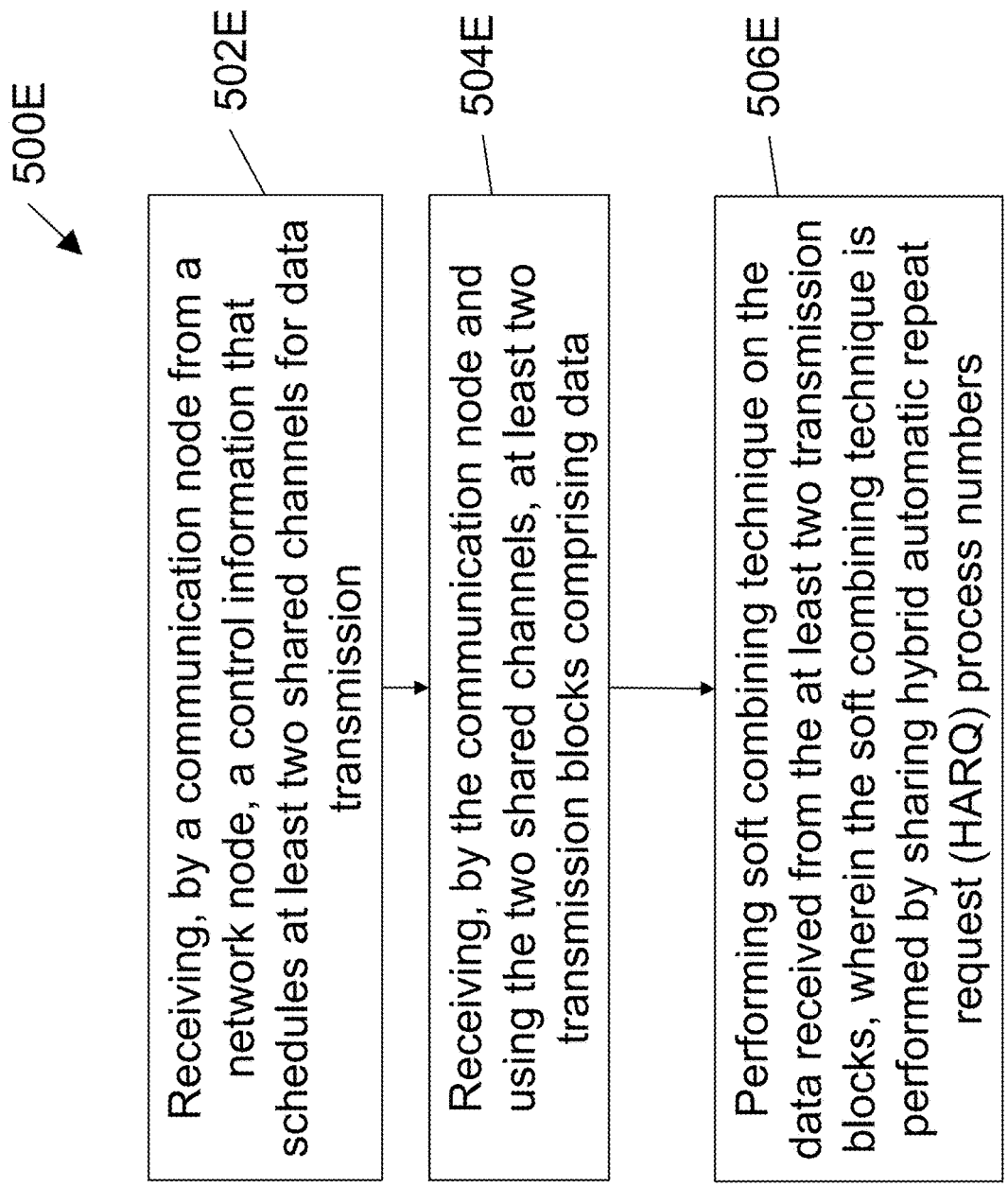

FIG. 5E shows an exemplary flowchart of a wireless communication method 500E. Operation 502E includes receiving, by a communication node from a network node, a control information that schedules at least two shared channels for data transmission, where the control information is received using a first channel associated with a first component carrier, where the at least two shared channels are associated with at least two component carriers, and where the at least two component carriers include one component carrier that is different from another component carrier. Operation 504E includes receiving, by the communication node and using the two shared channels, at least two transmission blocks comprising data. Operation 506E includes performing soft combining technique on the data received from the at least two transmission blocks, where the soft combining technique is performed by sharing hybrid automatic repeat request (HARQ) process numbers, where a maximum of the HARQ process numbers shared by the at least two component carriers is predefined or signaled using a radio resource control (RRC) signal.

In some embodiments of method 500E, the communication node performs the soft combining technique by sharing a first HARQ process number for a first set of c−⌊P/c⌋×c component carriers is ⌊P/c⌋, where the communication node performs the soft combining technique by sharing a second HARQ process number for a remaining set of component carriers is ⌈P/c⌉, where P the maximum of the HARQ process numbers, and where c is a total number of component carriers.

FIG. 5F shows an exemplary flowchart of a wireless communication method 500F. Operation 502F includes transmitting, by a network node to a communication node, a control information that schedules at least two shared channels for data transmission, where the control information is transmitted using a first channel associated with a first component carrier, where the at least two shared channels are associated with at least two component carriers that operate in at least two scheduling modes, where the at least two scheduling modes includes a first mode in which each of the at least two component carriers is configured to operate independently, and where the at least two scheduling modes includes a second mode in which all of the at least two component carriers are configured to operate as a single component carrier. Operation 504F includes transmitting, to the communication node and using the two shared channels, at least one transmission block comprising data.

In some embodiments of method 500F, the method further includes transmitting, in a radio resource control (RRC) signal, a field that includes at least one bit that indicates whether the at least two scheduling modes is indicated by the control information. In some embodiments of method 500F, the field includes at least a first bit and the at least two component carriers include a first component carrier and a second component carrier, the first bit indicates a first scheduling mode of the first component carrier and a second scheduling mode of the second component carrier.

Figure 5G:
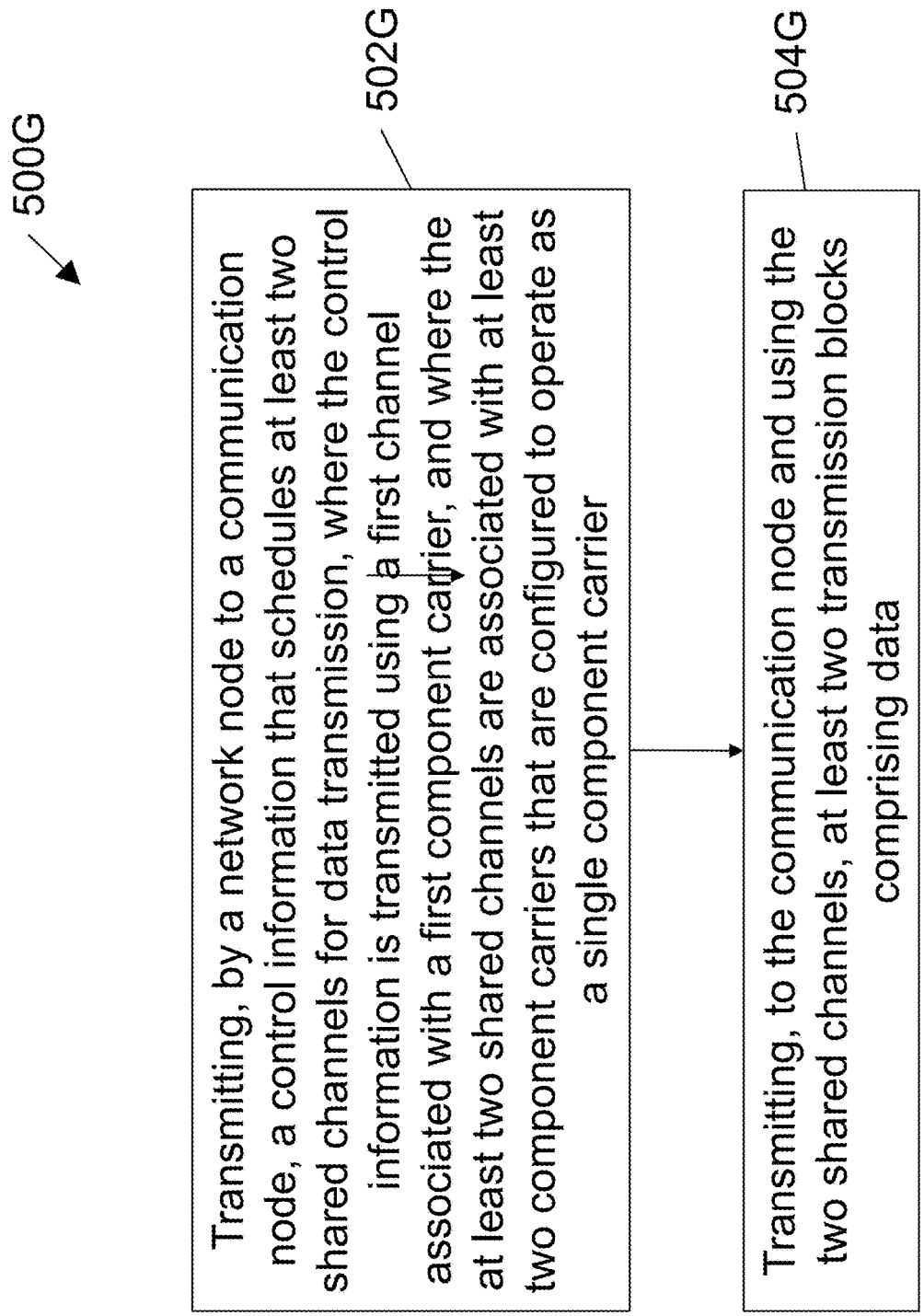

FIG. 5G shows an exemplary flowchart of a wireless communication method 500G. Operation 502G includes transmitting, by a network node to a communication node, a control information that schedules at least two shared channels for data transmission, where the control information is transmitted using a first channel associated with a first component carrier, and where the at least two shared channels are associated with at least two component carriers that are configured to operate as a single component carrier.

Operation 504G includes transmitting, to the communication node and using the two shared channels, at least two transmission blocks comprising data.

In some embodiments of method 500G, the at least two component carriers includes a component carrier having a lowest frequency band or a highest frequency band, where the component carrier is a benchmark component carrier. In some embodiments of method 500G, the at least two component carriers includes a component carrier that is a benchmark component carrier, the at least two component carriers include one or more non-benchmark component carriers other than the benchmark component carriers, and a first set of configuration parameters for the one or more non-benchmark component carries are based on a second set of configuration parameters of the benchmark component carriers. In some embodiments of method 500G, the at least two component carriers includes a component carrier that is a benchmark component carrier, the at least two component carriers include one or more non-benchmark component carriers other than the benchmark component carriers, and a frequency domain resource allocation (FDRA) parameters for the data transmission are based on cascaded bandwidth part (BWP) of all of the at least two component carriers.

Figure 5H:
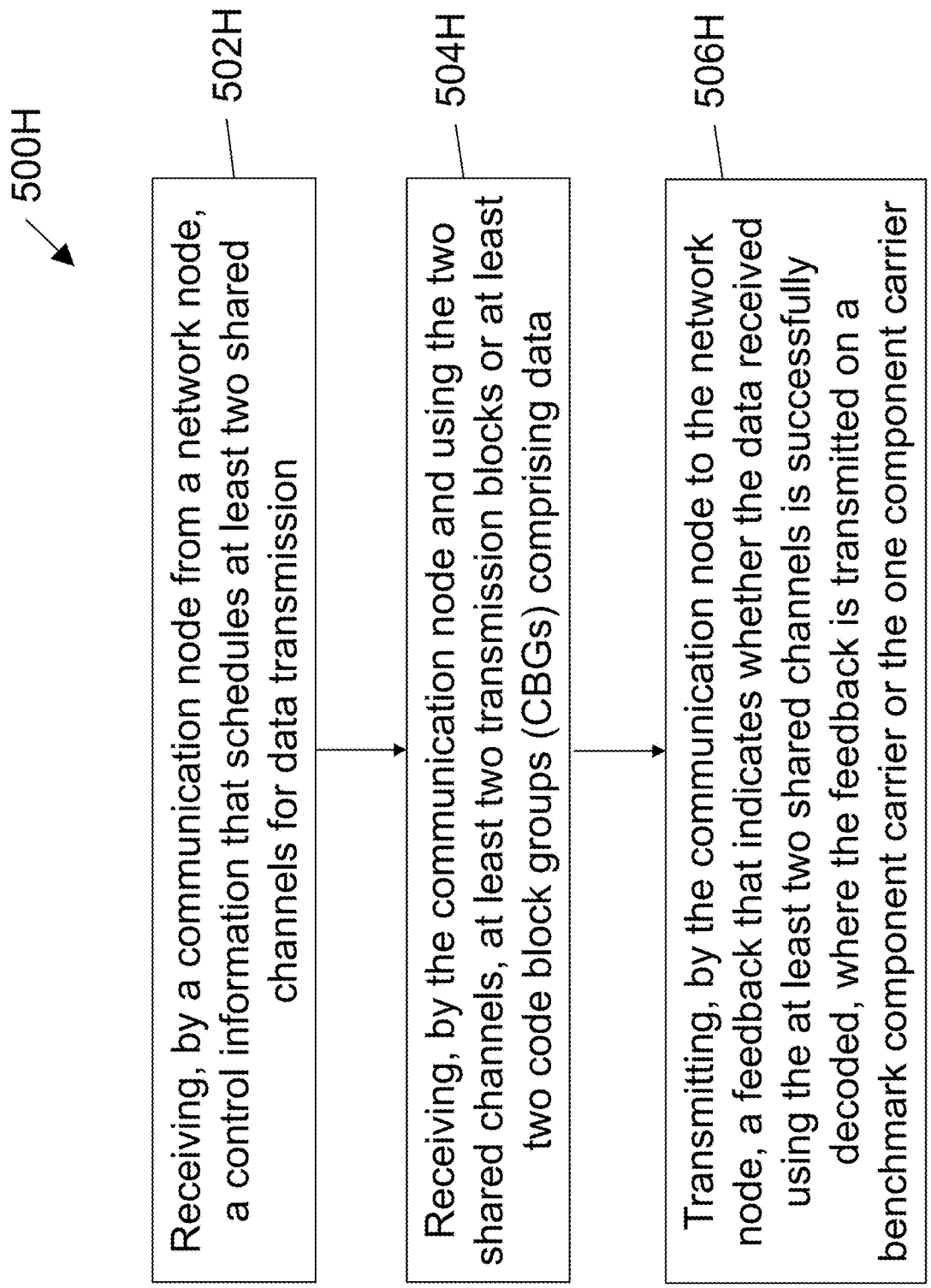

FIG. 5H shows an exemplary flowchart of a wireless communication method 500H. Operation 502H includes receiving, by a communication node from a network node, a control information that schedules at least two shared channels for data transmission, where the control information is received using a first channel associated with a first component carrier, where the at least two shared channels are associated with at least two component carriers. Operation 504H includes receiving, by the communication node and using the two shared channels, at least two transmission blocks or at least two code block groups (CBGs) comprising data, where the data is received within a bandwidth part (BWP) range of one component carrier of the at least two component carriers. Operation 506H includes transmitting, by the communication node to the network node, a feedback that indicates whether the data received using the at least two shared channels is successfully decoded, where the feedback is transmitted on a benchmark component carrier or the one component carrier.

Figure 5I:
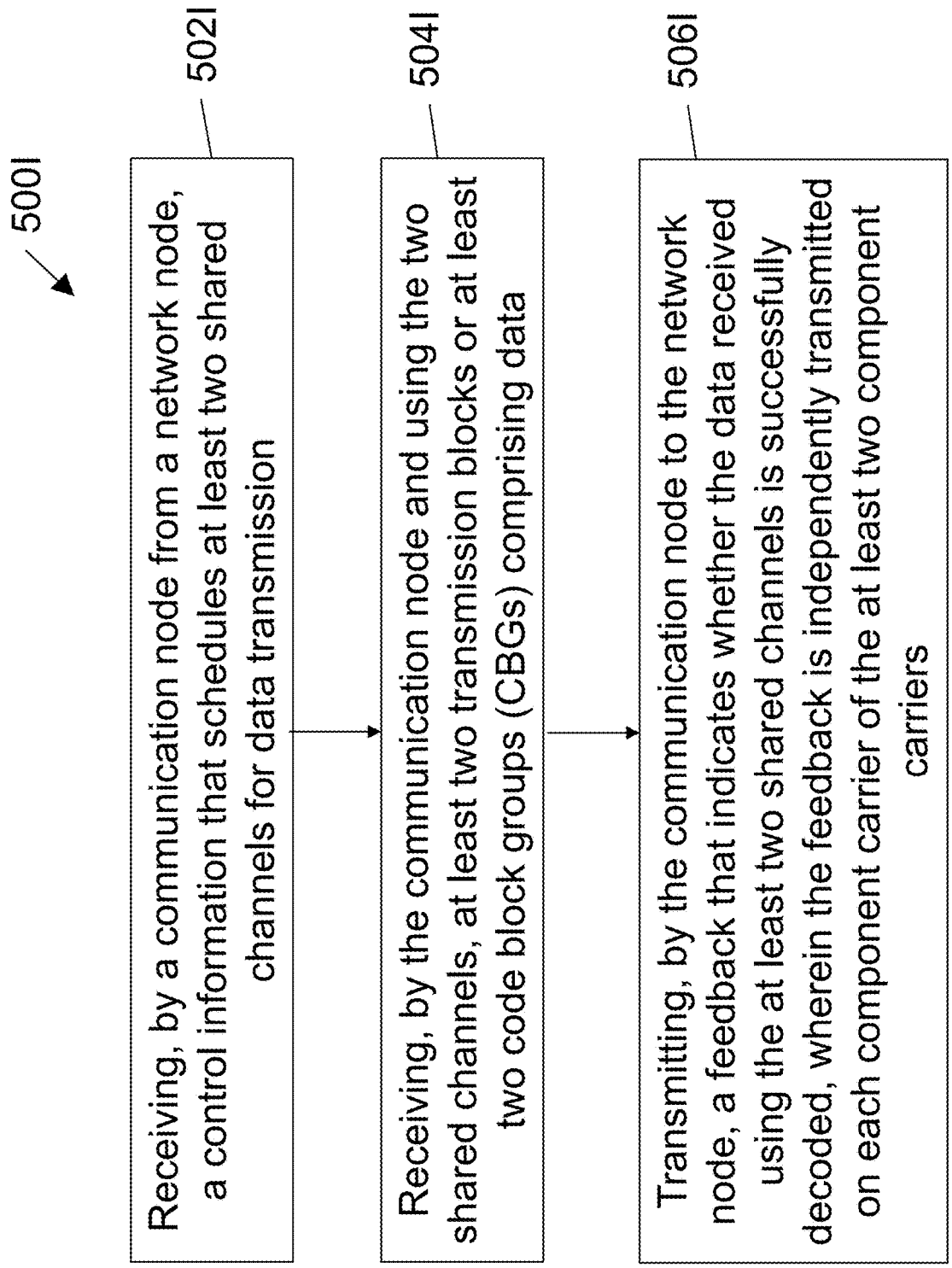

FIG. 5I shows an exemplary flowchart of a wireless communication method 500I. Operation 502I includes receiving, by a communication node from a network node, a control information that schedules at least two shared channels for data transmission, where the control information is received using a first channel associated with a first component carrier, where the at least two shared channels are associated with at least two component carriers. Operation 504I includes receiving, by the communication node and using the two shared channels, at least two transmission blocks or at least two code block groups (CBGs) comprising data, where the data is received within a bandwidth part (BWP) range of more than one component carrier of the at least two component carriers. Operation 506I includes transmitting, by the communication node to the network node, a feedback that indicates whether the data received using the at least two shared channels is successfully decoded, where the feedback is independently transmitted on each component carrier of the at least two component carriers.

Figure 5J:
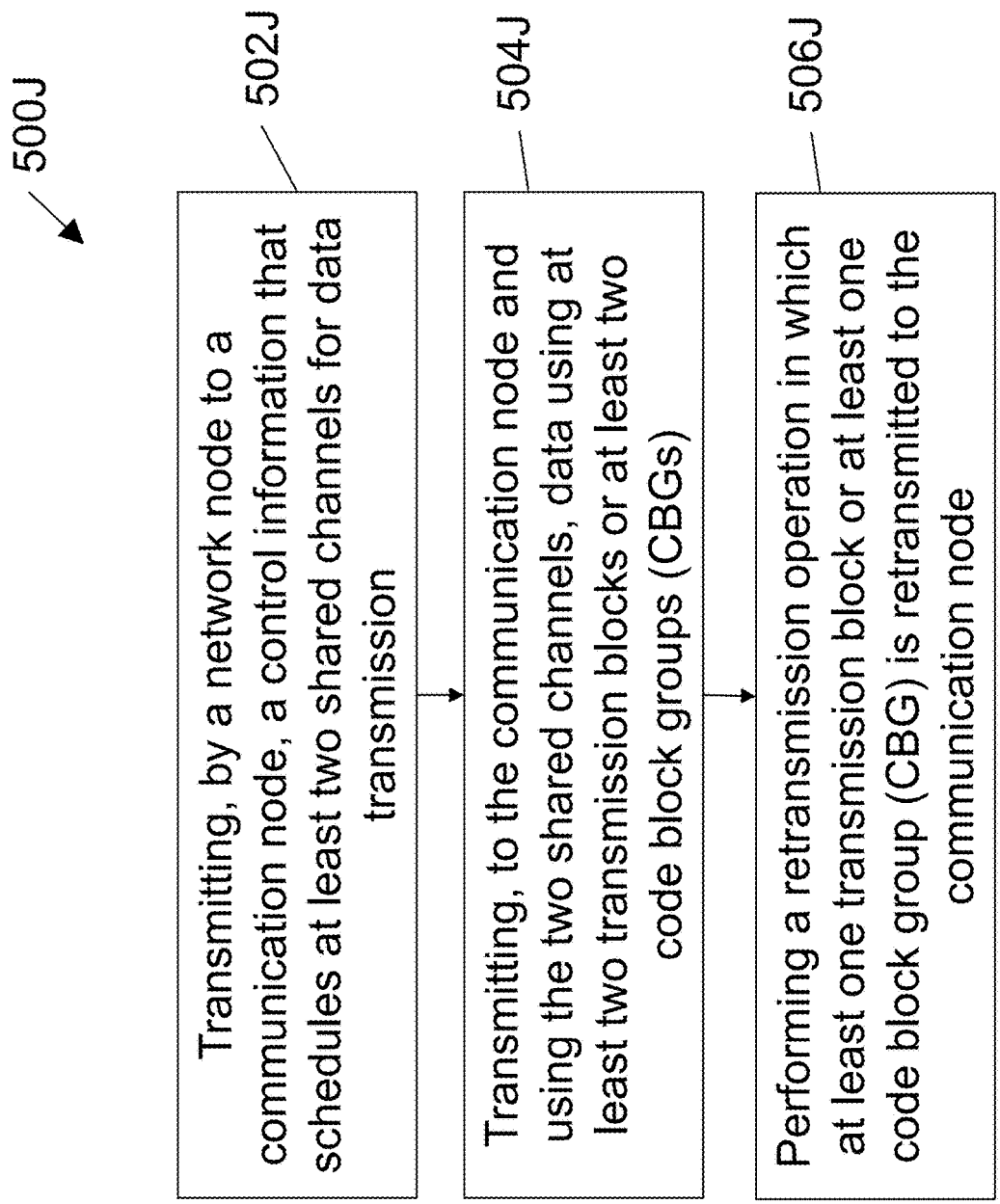

FIG. 5J shows an exemplary flowchart of a wireless communication method 500J. Operation 502J includes transmitting, by a network node to a communication node, a control information that schedules at least two shared channels for data transmission, where the control information is transmitted using a first channel associated with a first component carrier, and where the at least two shared channels are associated with at least two component carriers that are configured to operate as a single component carrier. Operation 504J includes transmitting, to the communication node and using the two shared channels, data using at least two transmission blocks or at least two code block groups (CBGs). Operation 506J includes performing a retransmission operation in which at least one transmission block or at least one code block group (CBG) is retransmitted to the communication node.

In some embodiments of method 500J, the retransmission operation is performed using a benchmark component carrier or using a component carrier having an active bandwidth part (BWP). In some embodiments of method(s) 500A-500J, one or more of the at least two component carriers is same as the first component carrier. In some embodiments of method(s) 500A-500J, the control information comprises a single downlink control information (DCI), where the first channel comprises a physical downlink control channel (PDCCH), and where the at least two shared channels comprise at least two physical downlink shared channels (PDSCHs).

Figure 6:
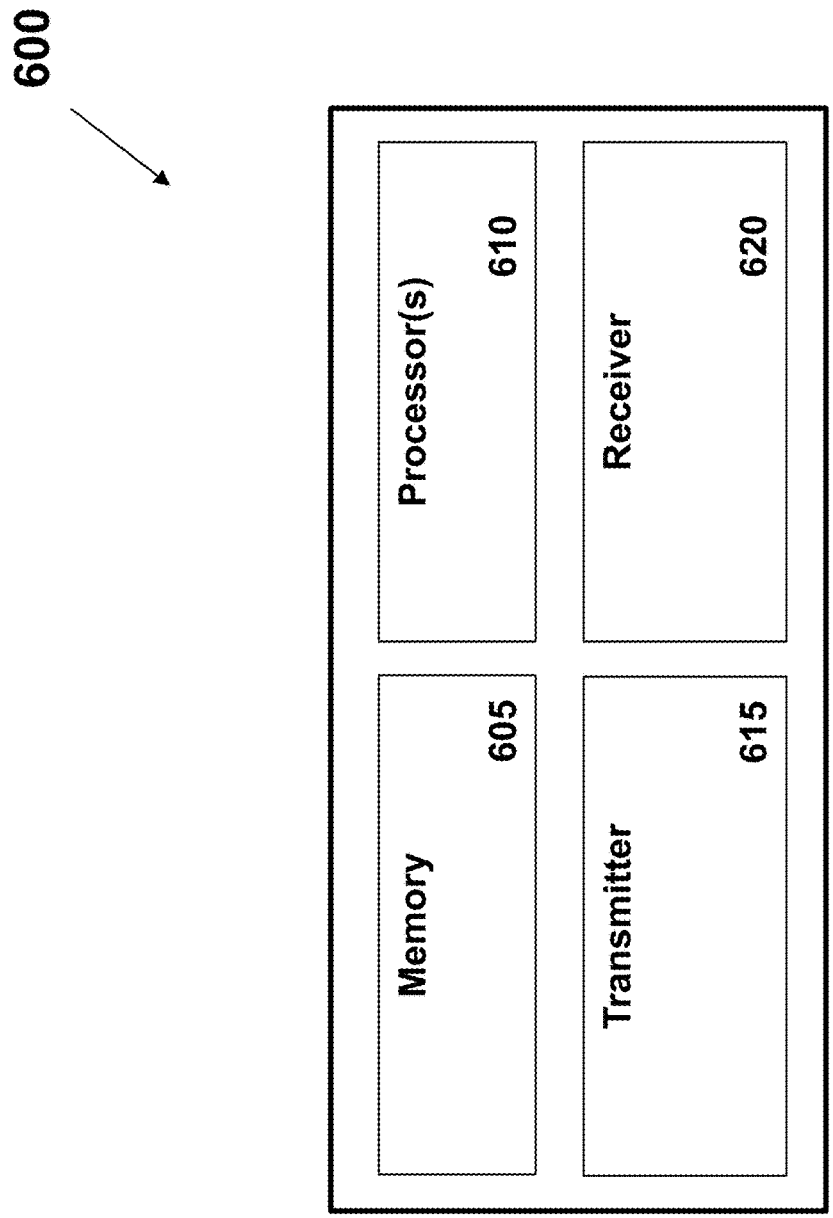
FIG. 6 shows an exemplary block diagram of a hardware platform that may be a part of a network node or a user equipment.

FIG. 6 shows an exemplary block diagram of a hardware platform 600 that may be a part of a network node or a user equipment. The hardware platform 600 includes at least one processor 610 and a memory 605 having instructions stored thereupon. The instructions upon execution by the processor 610 configure the hardware platform 600 to perform the operations described in FIGS. 1 to 5J and in the various embodiments described in this patent document. The transmitter 615 transmits or sends information or data to another node. For example, a network node transmitter can send a message to a user equipment. The receiver 620 receives information or data transmitted or sent by another node. For example, a user equipment can receive a message from a network node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   transmitting, by a network node to a communication node, a control information that schedules at least two shared channels for data transmission,
      wherein the control information is transmitted using a first channel associated with a first component carrier, and
      wherein the at least two shared channels are associated with at least two component carriers; and
   transmitting, to the communication node and using the at least two shared channels, at least two transmission blocks comprising data,
      wherein the at least two shared channels comprise a first shared channel and second shared channel,
      wherein data of the first shared channel is soft combined with data of the second shared channel that is associated with a benchmark component carrier,
      wherein the benchmark component carrier includes a primary component carrier, and
      wherein an identity of the first shared channel is indicated by signaling transmitted by the network node.

2. The method of claim 1, wherein the control information includes at least one bit that indicates to the communication node whether to perform soft combining of the data on the least two shared channels.

3. The method of claim 1, further comprising:
   transmitting a radio resource control (RRC) signaling that includes at least one bit that indicates to the communication node whether to perform soft combining of the data on the least two shared channels.

4. The method of claim 1, wherein the identity of the first shared channel is indicated by an index value included in the signaling transmitted in the first channel, wherein the identity is previously associated with the index value.

5. The method of claim 4, wherein the index value is included in a carrier indicator field (CIF) in a downlink control information (DCI).

6. The method of claim 1,
   wherein a communication between the network node and the communication node supports N transmission modes, and
   wherein the method further comprises:
      transmitting a radio resource control (RRC) signal that includes $\lceil \sqrt{N} \rceil$ bit, wherein $\lceil \sqrt{N} \rceil$ indicates a nearest integer greater than or equal to a square root of N.

7. The method of claim 1,
   wherein a communication between the network node and the communication node supports N transmission modes,
   wherein the control information includes $\lceil \sqrt{N} \rceil$ bit, and
   wherein $\lceil \sqrt{N} \rceil$ indicates a nearest integer greater than or equal to a square root of N.

8. A wireless communication method, comprising:
   receiving, by a communication node from a network node, a control information that schedules at least two shared channels for data transmission,
      wherein the control information is received using a first channel associated with a first component carrier, and
      wherein the at least two shared channels are associated with at least two component carriers;
   receiving, by the communication node and using the two shared channels, at least two transmission blocks comprising data,
      wherein the at least two shared channels comprise a first shared channel and second shared channel,
      wherein data of the first shared channel is soft combined with data of the second shared channel that is associated with a benchmark component carrier,
      wherein the benchmark component carrier includes a primary component carrier, and
      wherein an identity of the first shared channel is indicated by signaling received by the communication node.

9. The method of claim 8,
   wherein the communication node performs the soft combining technique by sharing a first HARQ process number for a first set of $$c - \left\lfloor \frac{P}{c} \right\rfloor \times c$$

component carriers is $$\left\lfloor \frac{P}{c} \right\rfloor,$$

wherein the communication node performs the soft combining technique by sharing a second HARQ process number for a remaining set of component carriers is $$\left\lceil \frac{P}{c} \right\rceil,$$

wherein P the maximum of the HARQ process numbers, and
wherein c is a total number of component carriers.

10. The method of claim 8, further comprising:
performing soft combining technique on the data received from the at least two transmission blocks, wherein the soft combining technique is performed by sharing hybrid automatic repeat request (HARQ) process numbers, wherein a maximum of the HARQ process numbers shared by the at least two component carriers is predefined or signaled using a radio resource control (RRC) signal.

11. A network node for wireless communication, comprising:
at least one processor that when configured causes the network node to:
transmit, to a communication node, a control information that schedules at least two shared channels for data transmission,
wherein the control information is transmitted using a first channel associated with a first component carrier, and
wherein the at least two shared channels are associated with at least two component carriers; and
transmit, to the communication node and using the at least two shared channels, at least two transmission blocks comprising data,
wherein the at least two shared channels comprise a first shared channel and second shared channel,
wherein data of the first shared channel is soft combined with data of the second shared channel that is associated with a benchmark component carrier,
wherein the benchmark component carrier includes a primary component carrier, and
wherein an identity of the first shared channel is indicated by a signaling that is transmitted.

12. The network node of claim 11, wherein the control information includes at least one bit that indicates to the communication node whether to perform soft combining of the data on the least two shared channels.

13. The network node of claim 11, wherein the at least one processor is further configured to:
transmit a radio resource control (RRC) signaling that includes at least one bit that indicates to the communication node whether to perform soft combining of the data on the least two shared channels.

14. The network node of claim 11, wherein the identity of the first shared channel is indicated by an index value included in the signaling transmitted in the first channel, wherein the identity is previously associated with the index value.

15. The network node of claim 14, wherein the index value is included in a carrier indicator field (CIF) in a downlink control information (DCI).

16. The network node of claim 11,
wherein a communication between the network node and the communication node supports N transmission modes, and wherein the at least one processor is further configured to:
transmit a radio resource control (RRC) signal that includes $\lceil \sqrt{N} \rceil$ bit, wherein $\lceil \sqrt{N} \rceil$ indicates a nearest integer greater than or equal to a square root of N.

17. The network node of claim 11,
wherein a communication between the network node and the communication node supports N transmission modes,
wherein the control information includes $\lceil \sqrt{N} \rceil$ bit, and
wherein $\lceil \sqrt{N} \rceil$ indicates a nearest integer greater than or equal to a square root of N.

18. A communication node for wireless communication, comprising:
at least one processor that when configured causes the communication node to:
receive, from a network node, a control information that schedules at least two shared channels for data transmission,
wherein the control information is received using a first channel associated with a first component carrier, and
wherein the at least two shared channels are associated with at least two component carriers;
receive, by the communication node and using the two shared channels, at least two transmission blocks comprising data; and
wherein the at least two shared channels comprise a first shared channel and second shared channel,
wherein data of the first shared channel is soft combined with data of the second shared channel that is associated with a benchmark component carrier,
wherein the benchmark component carrier includes a primary component carrier, and
wherein an identity of the first shared channel is indicated by signaling received by the communication node.

19. The communication node of claim 18,
wherein the at least one processor of the communication node is configured to performs the soft combining technique by being configured to share a first HARQ process number for a first set of $$c - \left\lfloor \frac{P}{c} \right\rfloor \times c$$

component carriers is $$\left\lfloor \frac{P}{c} \right\rfloor,$$

wherein the at least one processor of the communication node is configured to performs the soft combining technique by being configured to share a second HARQ process number for a remaining set of component carriers is $$\left\lceil \frac{P}{c} \right\rceil,$$

wherein P the maximum of the HARQ process numbers, and
wherein c is a total number of component carriers.

20. The communication node of claim 18, wherein the at least one processor is further configured to cause the communication node to:
perform soft combining technique on the data received from the at least two transmission blocks, wherein the soft combining technique is performed by the at least one processor configured to share hybrid automatic repeat request (HARQ) process numbers, wherein a maximum of the HARQ process numbers shared by the at least two component carriers is predefined or signaled using a radio resource control (RRC) signal.

* * * * *